US012196152B2

(12) United States Patent
Akase

(10) Patent No.: US 12,196,152 B2
(45) Date of Patent: Jan. 14, 2025

(54) THROTTLE DEVICE FOR ENGINE

(71) Applicant: MIKUNI CORPORATION, Tokyo (JP)

(72) Inventor: Shogo Akase, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/218,629

(22) Filed: Jul. 6, 2023

(65) Prior Publication Data

US 2024/0035420 A1 Feb. 1, 2024

(30) Foreign Application Priority Data

Jul. 27, 2022 (JP) ................................ 2022-119786

(51) Int. Cl.
*F02D 9/10* (2006.01)
*F02D 11/10* (2006.01)

(52) U.S. Cl.
CPC ............ *F02D 9/1065* (2013.01); *F02D 11/10* (2013.01)

(58) Field of Classification Search
CPC ............................... F02D 9/1065; F02D 11/10
See application file for complete search history.

(56) References Cited

U.S. PATENT DOCUMENTS 9,562,483 B2 * 2/2017 Shishido ............. F02D 41/0002

FOREIGN PATENT DOCUMENTS

| | | |
|---|---|---|
| EP | 2 202 398 A2 | 6/2010 |
| EP | 2 202 398 A3 | 6/2010 |
| JP | 2006-97627 A | 4/2006 |
| WO | WO 00/58614 A1 | 10/2000 |

OTHER PUBLICATIONS

Extended European Search Report issued in the corresponding EP patent application 23186923.1 dated Nov. 28, 2023.

* cited by examiner

*Primary Examiner* — Kevin A Lathers
(74) *Attorney, Agent, or Firm* — STAAS & HALSEY LLP

(57) ABSTRACT

The present invention provides a throttle device for an engine enabling an operation of fitting a support shaft supporting an intermediate gear into a positioning hole and an operation of causing the intermediate gear and a counterpart gear to mate with each other to be easily performed when a throttle body-side assembly and a gear cover-side assembly, which have individually been assembled, are coupled to each other. In the throttle device, a driven gear 14 of a throttle shaft 4, a driving gear 16 of a motor 15, and an intermediate gear 19 supported by a support shaft 17 are accommodated between a throttle body-side assembly 26 and a gear cover-side assembly 27, the support shaft 17 has one end 17*a* secured to a gear case 9 of the throttle body-side assembly 26, a positioning hole 20 into which the other end 17*b* of the support shaft 17 is inserted with the coupling between the assemblies 26 and 27 is formed in a gear cover 10 of the gear cover-side assembly 27, and a projecting length L1 of the other end 17*b* of the support shaft 17 from an end surface of the intermediate gear 19 is set to be longer than a projecting length L2 of the driving gear 16 from an opening surface of the positioning hole 20.

3 Claims, 11 Drawing Sheets

THROTTLE DEVICE FOR ENGINE

CROSS REFERENCE TO RELATED APPLICATIONS

This application claims priority benefit from Japanese Patent Application No. 2022-119786 filed on Jul. 27, 2022, the contents of which are incorporated herein by reference.

BACKGROUND OF THE INVENTION

Field of the Invention

The present invention relates to a throttle device for an engine that drives a throttle valve and opens and closes it using an electric motor.

Description of the Related Art

As a throttle device for an engine, Patent Document 1, for example, discloses a throttle device for an engine in which a transmission chamber is defined between a throttle body and a gear cover and an electric motor and a deceleration device are accommodated therein. The deceleration device includes a pinion gear secured to the electric motor, a final gear secured to a valve shaft, and an intermediate gear supported by a support shaft, and a large diameter gear portion of the intermediate gear mates with the pinion gear, and a small diameter gear portion mates with the final gear. One end of the support shaft supporting the intermediate gear is press-fitted to the gear cover, a flange of the electric motor with the pinion gear secured thereto is temporarily secured to the gear cover with a screw, and a circuit board is further fixedly attached to the gear cover with a screw.

With such a configuration, it is possible to perform the press-fitting of the support shaft of the intermediate gear, the temporarily securing of the flange of the electric motor, the securing of the circuit board with the screw, and the like in a state of the gear cover alone and to assemble them as a gear cover-side assembly. Therefore, when the throttle device is assembled, it is possible to perform the assembly operation of the gear cover-side assembly in parallel with an assembly operation of a throttle body-side assembly in which the valve shaft and the like are attached to the throttle body and thereby to improve production efficiency.

Also, when the throttle body-side assembly and the gear cover-side assembly which have been completely assembled are coupled, the other side of the support shaft of the intermediate gear on the side of the gear cover is fitted into a positioning hole on the side of the throttle body with the electric motor on the side of the gear cover accommodated in a recessed portion on the side of the throttle body.

PRIOR ART DOCUMENT

Patent Document

Patent Document 1: Japan Patent Laid-Open No. 2006-97627

However, the throttle device in Patent Document 1 has a problem that it is difficult to perform the operation of coupling the throttle body-side assembly to the gear cover-side assembly.

In other words, when the assemblies are coupled to each other, it is necessary not only to fit the other end of the support shaft on the side of the gear cover to the positioning hole on the side of the throttle body but also to cause the small diameter gear portion of the intermediate gear supported by the support shaft to mate with the final gear on the side of the throttle body. Therefore, the other end of the support shaft is fitted into the positioning hole and the small diameter gear portion is caused to mate with the final gear with the gear cover caused to approach the throttle body in the coupling operation.

In order to cause the small diameter gear portion and the final gear to mate with each other, it is necessary to accurately maintain their mutual positional relationship, in other words, a gear pitch and to finely adjust relative angles such that tops and bottoms of the gears correspond to each other. It is necessary to perform such an operation and to fit the other end of the support shaft into the positioning hole in parallel with this, and further, it may not be possible for an operator to visually recognize the mating state between the gears and the positional relationship between the support shaft and the positioning hole, which are important, due to interruption of the gear cover. This results in a problem that a very difficult and complicated operation is required to couple the throttle body-side assembly to the gear cover-side assembly.

The present invention was made in order to solve such a problem, and an object thereof is to provide a throttle device for an engine enabling an operation of fitting a support shaft supporting an intermediate gear into a positioning hole and an operation of causing the intermediate gear and a counterpart gear to mate with each other to be easily performed when a throttle body-side assembly and a gear cover-side assembly, which have individually been assembled, are coupled to each other.

SUMMARY OF THE INVENTION

In order to achieve the above object, a throttle device for an engine according to the present invention is a throttle device for an engine comprising a throttle body-side assembly and a gear cover-side assembly coupled to each other, the throttle body-side assembly including a throttle body and a throttle valve supported at the throttle body by a throttle shaft such that the throttle valve is able to open and close, the gear cover-side assembly including a gear cover and a motor attached to the gear cover, the throttle device further comprising a driven gear secured to an end portion of the throttle shaft, a driving gear secured to an output shaft of the motor, and an intermediate gear which is supported by a support shaft and transmits rotation of the driving gear to the driven gear, which are accommodated in a gear accommodating chamber defined between a gear case provided at the throttle body and the gear cover, wherein the support shaft has one end secured to any one of the gear case and the gear cover and configures the throttle body-side assembly or the gear cover-side assembly along with the intermediate gear, the intermediate gear mates with the driving gear of the gear cover-side assembly or the driven gear of the throttle body-side assembly with the coupling between the throttle body-side assembly and the gear cover-side assembly, the other one of the gear case and the gear cover includes a positioning hole into which the other end of the support shaft is inserted with the coupling between the throttle body-side assembly and the gear cover-side assembly, and a projecting length of the other end of the support shaft from an end surface of the intermediate gear is set to be longer than a projecting length of the driving gear or the driven gear from an opening surface in which the positioning hole is open.

In another aspect, the support shaft may have one end secured to the gear case and configure the throttle body-side assembly along with the intermediate gear, the gear cover may include the positioning hole into which the other end of the support shaft is inserted with the coupling between the throttle body-side assembly and the gear cover-side assembly, and the projecting length of the other end of the support shaft from the end surface of the intermediate gear may be set to be longer than the projecting length of the driving gear from the opening surface of the gear cover in which the positioning hole is open.

In another aspect, the support shaft may have one end secured to the gear cover and configure the gear cover-side assembly along with the intermediate gear, the gear case may include the positioning hole into which the other end of the support shaft is inserted with the coupling between the throttle body-side assembly and the gear cover-side assembly, and the projecting length of the other end of the support shaft from the end surface of the intermediate gear may be set to be longer than the projecting length of the driven gear from the opening surface of the gear case in which the positioning hole is open.

In another aspect, the intermediate gear may include a large diameter portion which mates with the driving gear and a small diameter portion which is provided in parallel with the large diameter portion on the side of the gear case and mates with the driven gear, and a projecting length of the other end of the support shaft from an end surface of the large diameter portion as the projecting length of the other end of the support shaft from the end surface of the intermediate gear may be set to be longer than the projecting length of the driving gear from the opening surface of the gear cover in which the positioning hole is open.

In another aspect, the intermediate gear may include a large diameter portion which mates with the driving gear and a small diameter portion which is provided in parallel with the large diameter portion on the side of the gear case and mates with the driven gear, and a projecting length of the other end of the support shaft from an end surface of the small diameter portion as the projecting length of the other end of the support shaft from the end surface of the intermediate gear may be set to be longer than the projecting length of the driven gear from the opening surface of the gear case in which the positioning hole is open.

In another aspect, the motor may be attached to the gear cover in a posture with the output shaft directed in a direction in which the positioning hole is open.

In another aspect, the motor may be attached to the gear cover in a posture with the output shaft directed in a direction in which the other end of the support shaft projects.

In another aspect, the intermediate gear may be one of a plurality of gears which mate with each other and transmit rotation of the driving gear to the driven gear.

According to the throttle device of the present invention, it is possible to easily perform an operation of fitting the support shaft supporting the intermediate gear into the positioning hole and an operation of causing the intermediate gear and the counterpart gear to mate with each other when the throttle body-side assembly and the gear cover-side assembly, which have individually been assembled, are coupled to each other.

DETAILED DESCRIPTION OF THE INVENTION

Hereinafter, an embodiment of a throttle device for an engine which implements the present invention will be described.

<<Overall Configuration>>

Figure 1:
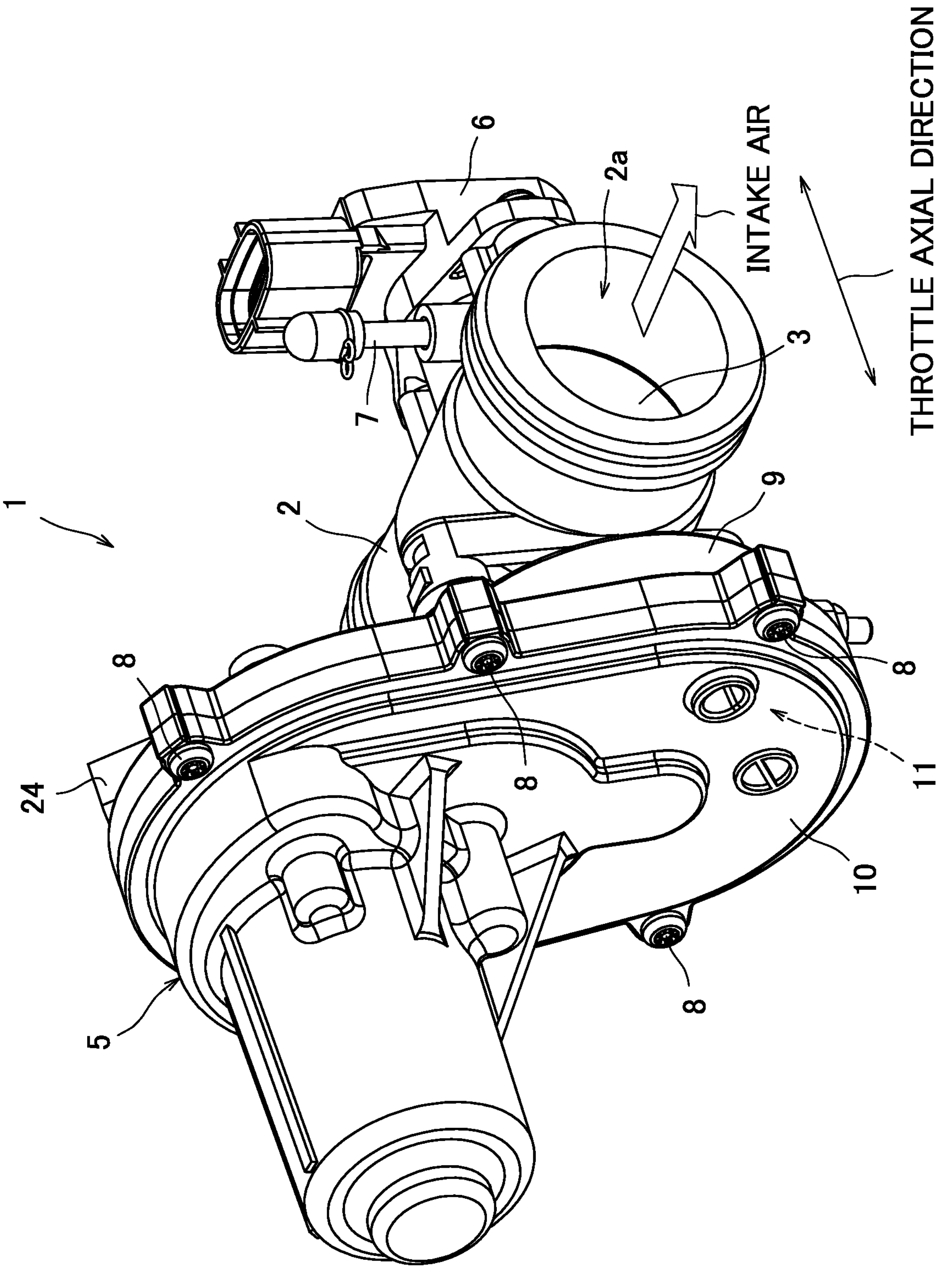
FIG. 1 is a perspective view illustrating a throttle device for an engine according to an embodiment.
Figure 2:
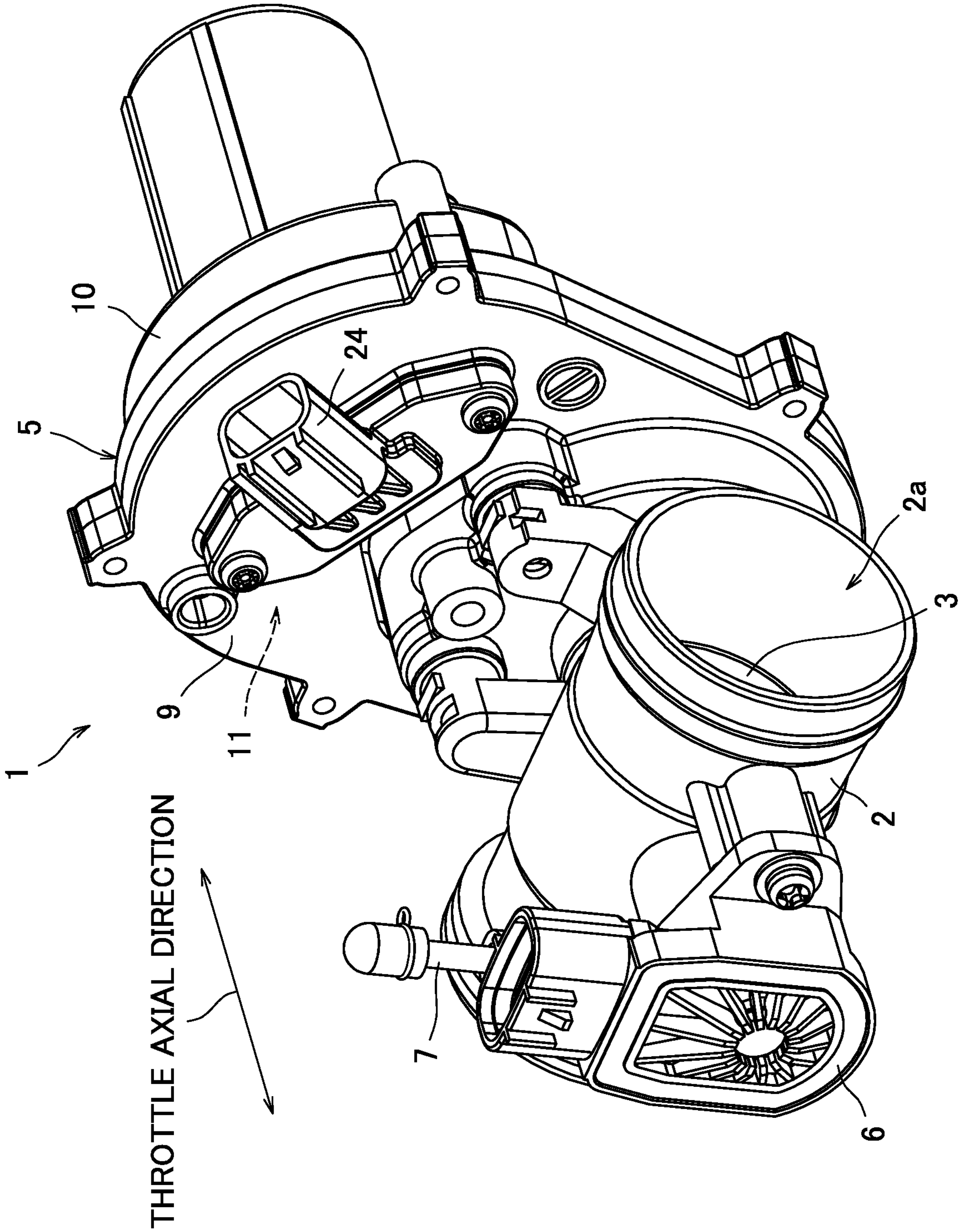
FIG. 2 is a perspective view of the throttle device seen from another angle.

FIG. 1 is a perspective view illustrating a throttle device for an engine according to the present embodiment, and FIG. 2 is a perspective view of the throttle device seen from another angle.

A throttle device 1 according to the embodiment is adapted to be attached to a single-cylinder engine mounted as a power source for traveling on a motorized two-wheeled vehicle. A throttle bore 2*a* that communicates with the inside of the cylinder of the engine, which is not illustrated, is formed to penetrate through a throttle body 2 of the throttle device 1. In a state where it is mounted on a vehicle, one end of the throttle bore 2*a* is connected to an air cleaner, the other end is connected to an intake manifold of the engine, and intake air filtrated by the air cleaner is supplied to the inside of the cylinder of the engine through the throttle bore 2*a* and the intake manifold.

A throttle valve 3 is supported inside the throttle bore 2*a* by a throttle shaft 4 such that the throttle valve 3 can open and close, the throttle shaft 4 is driven by a gear unit 5 attached to the throttle body 2, and the throttle valve 3 is thereby opened or closed to adjust the amount of intake air. Note that 6 in FIGS. 1 and 2 denotes a throttle position sensor that detects the opening degree of the throttle valve 3, and 7 denotes a intake air pressure extracting port that is connected to a intake air pressure sensor, which is not illustrated. In the following description, the direction which an axial line C3 of the throttle shaft 4 follows may be referred to as a throttle axial direction.

<<Gear Unit 5>>

Figure 3:
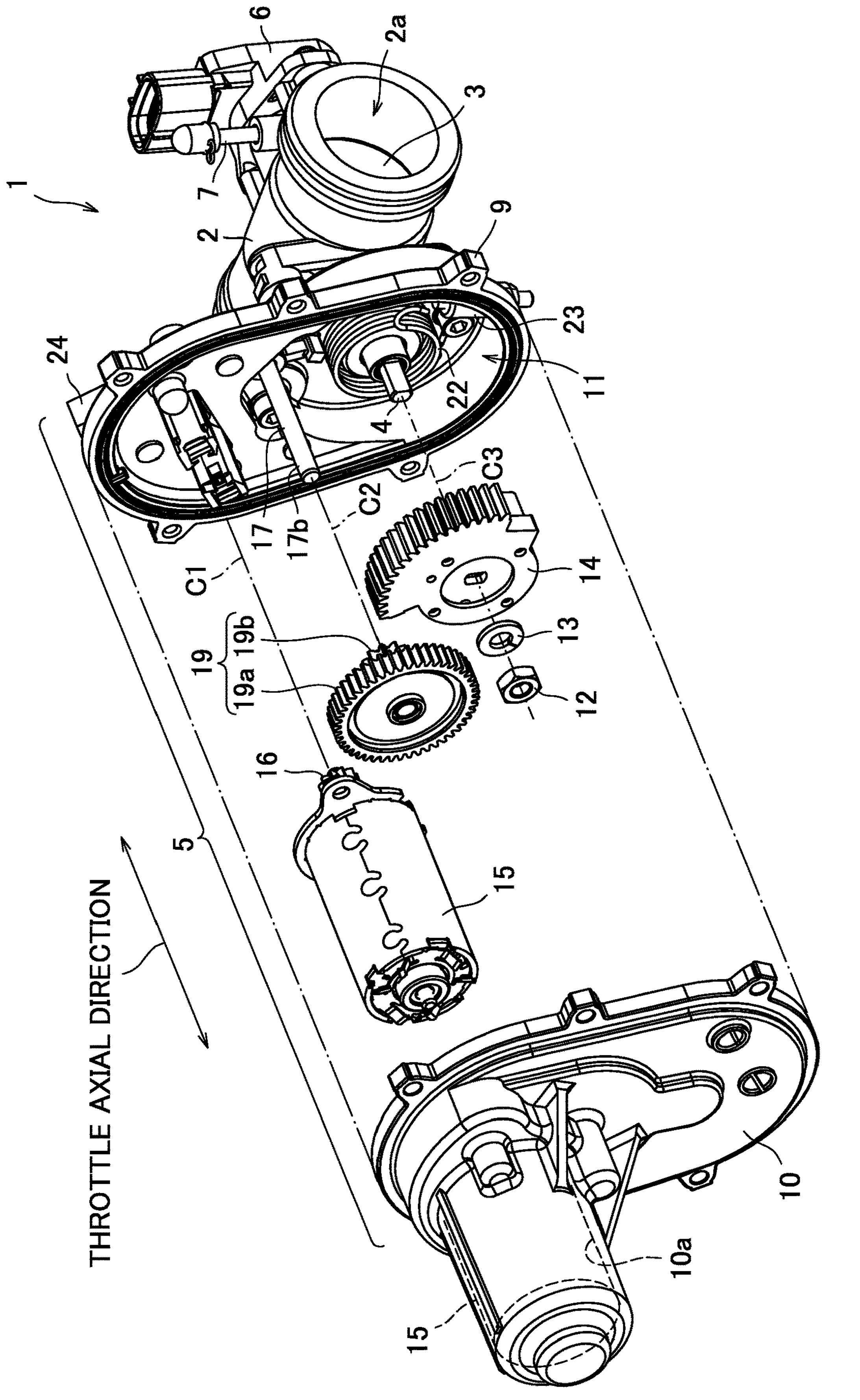
FIG. 3 is an exploded perspective view illustrating a gear unit.
Figure 4:
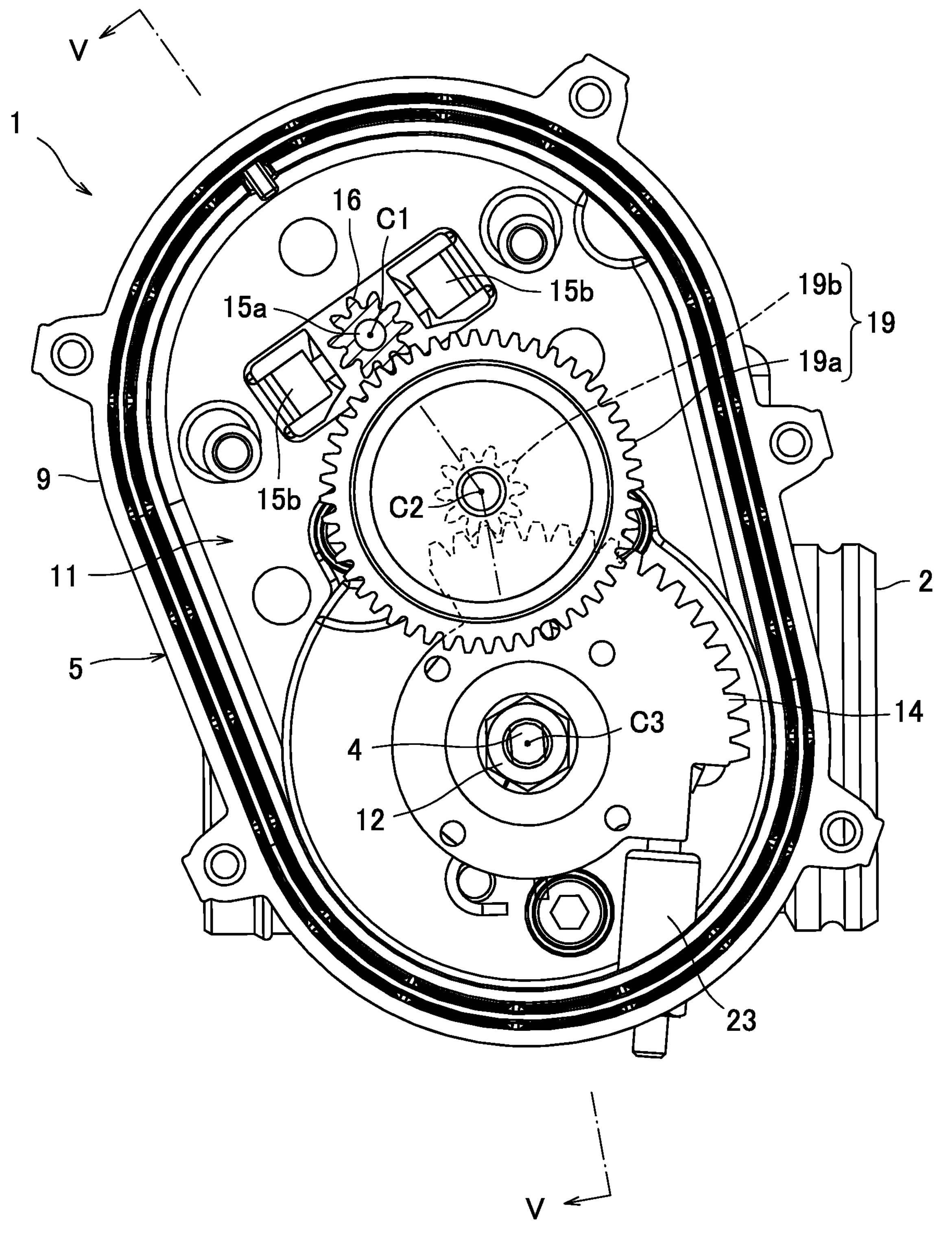
FIG. 4 is a side view illustrating a mating state of each gear in a gear accommodating chamber with a gear cover detached therefrom.
Figure 5:
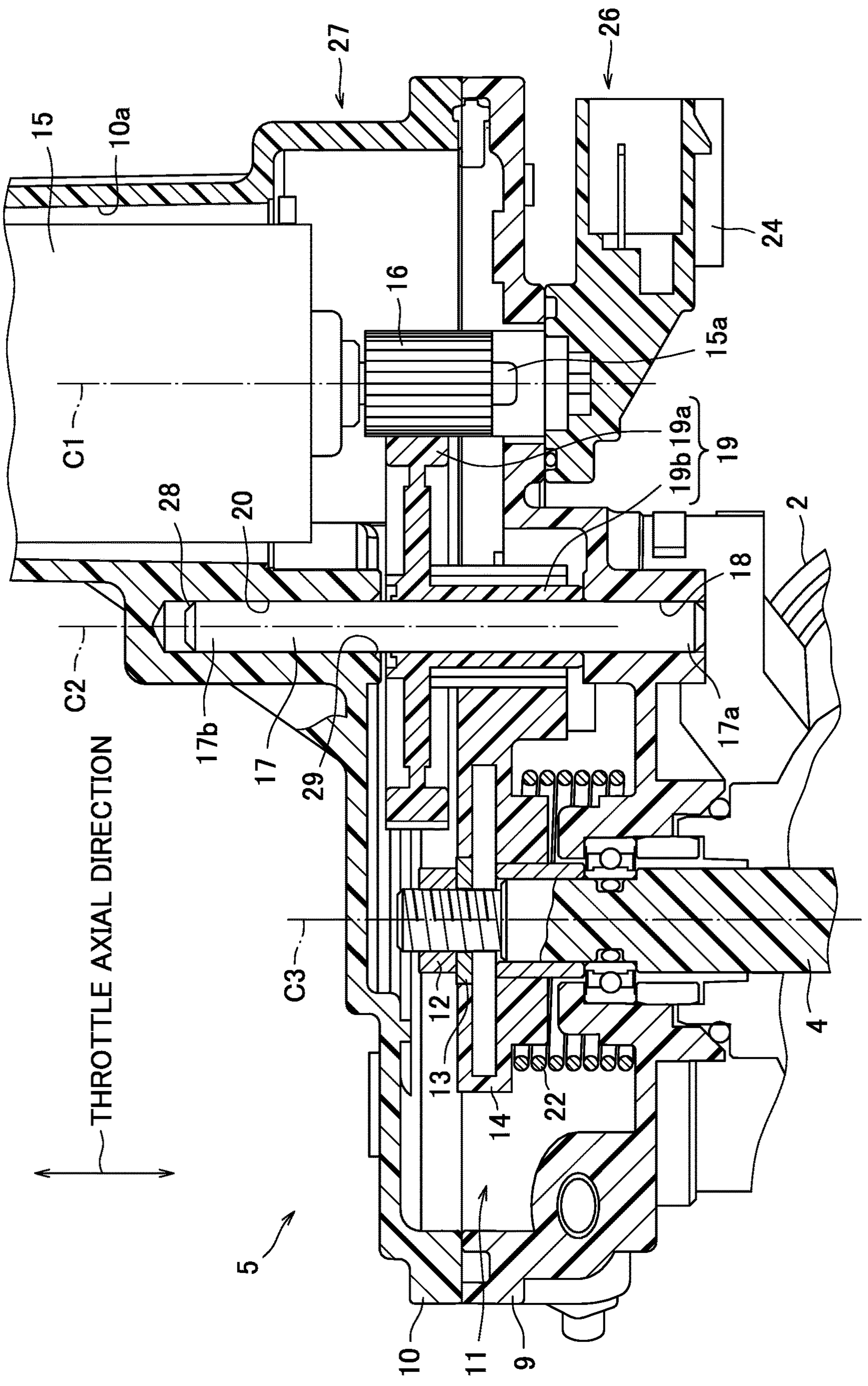
FIG. 5 is a sectional view along the line V-V in FIG. 4 illustrating a mating state of each gear in the gear accommodating chamber.

Next, details of the gear unit 5 will be described. FIG. 3 is an exploded perspective view illustrating the gear unit 5, FIG. 4 is a side view illustrating a mating state of each gear inside a gear accommodating chamber with a gear cover detached therefrom, and FIG. 5 is a sectional view along the line V-V in FIG. 4 illustrating a mating state of each gear inside the gear accommodating chamber.

A gear case 9 is attached to one side of the throttle body 2 in the throttle axial direction, a gear cover 10 is fastened to the gear case 9 with a screw 8, and a gear accommodating chamber 11 is defined therein. One end of the throttle shaft 4 projects to the inside of the gear accommodating chamber 11, and a driven gear 14 is fastened thereto via a washer 13 by a bolt 12. A motor 15 is disposed inside a motor chamber 10*a* formed in the gear cover 10, and an output shaft 15*a* thereof projects to the inside of the gear accommodating chamber 11 along an axial line C1 that is parallel with an axial line C3 of the throttle shaft 4 with a driving gear 16 secured to the output shaft 15*a*. Note that the gear case 9 may be formed integrally with the throttle body 2.

A support shaft 17 is disposed between the driven gear 14 and the driving gear 16 inside the gear accommodating chamber 11, the support shaft 17 is maintained in a posture along an axial line C2 that is parallel with the axial line C3 of the throttle shaft 4, and one end 17*a* thereof is press-fitted into a press-fitting hole 18 penetrating through the gear case 9. An intermediate gear 19 is rotatably supported by the support shaft 17, and the other end 17*b* of the support shaft 17 projects on the side of the gear cover 10 from an end surface of the intermediate gear 19 and is fitted into a positioning hole 20 formed in the gear cover 10. The intermediate gear 19 includes a large diameter portion 19*a* that mates with the driving gear 16 and a small diameter portion 19*b* that is integrally provided in parallel with the large diameter portion 19*a* on the side of the gear case 9 and mates with the driven gear 14. Therefore, rotation of the driving gear 16 caused by the motor 15 is transmitted to the large diameter portion 19*a* of the intermediate gear 19 and is further transmitted from the small diameter portion 19*b* to the driven gear 14.

A return spring 22 is wound around the throttle shaft 4 inside the gear accommodating chamber 11 and biases the throttle valve 3 in a closing direction along with the throttle shaft 4. Once the driven gear 14 is turned in the closing direction by the return spring 22, one side thereof abuts a stopper portion 23 inside the gear accommodating chamber 11, turning thereof is restricted, and the throttle valve 3 is thereby maintained at a fully closed position. The throttle valve 3 is opened or closed via each of the gears 14, 16, and 19 and the throttle shaft 4 in accordance with the direction of the rotation of the driving gear 16 caused by the motor 15 while receiving such a biasing force of the return spring 22.

A pair of contact points 15*b* of the motor 15 are electrically connected to a connector 24 provided in the gear case 9. In a state where it is mounted on a vehicle, a harness extending from a controller on the side of a vehicle body is connected to the connector 24, the motor 15 is controlled by the controller in accordance with the amount of throttle operation of the vehicle and the like, and the throttle valve 3 is driven and opened or closed.

<<Dimension Setting of Each Part for Coupling Assemblies>>

Although details will be described later, the throttle device 1 according to the present embodiment employs a procedure of performing assembly operations of the throttle body 2 side and the gear cover 10 side in parallel and coupling them to each other after completion of the assembling. The throttle valve 3, the throttle shaft 4, the driven gear 14, the gear case 9, the support shaft 17, and the intermediate gear 19 are assembled with the throttle body 2, and the state after the assembling will be referred to as a throttle body-side assembly 26 below. Also, the motor 15 and the driving gear 16 are assembled with the gear cover 10, and the state after the assembling will be referred to as a gear cover-side assembly 27 below.

Figure 6:
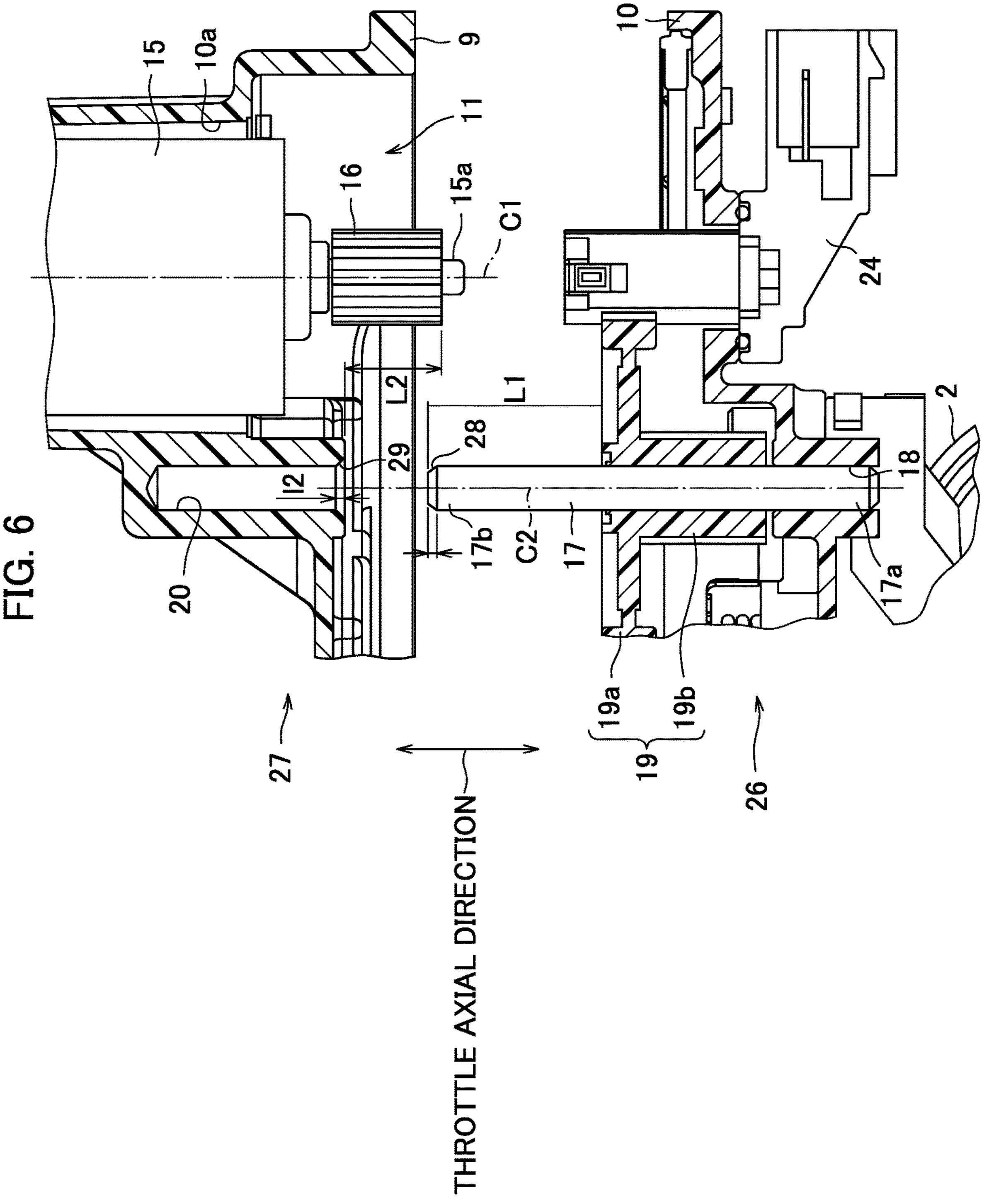
FIG. 6 is a sectional view illustrating a state where a throttle body-side assembly and a gear cover-side assembly are caused to face each other.
Figure 7:
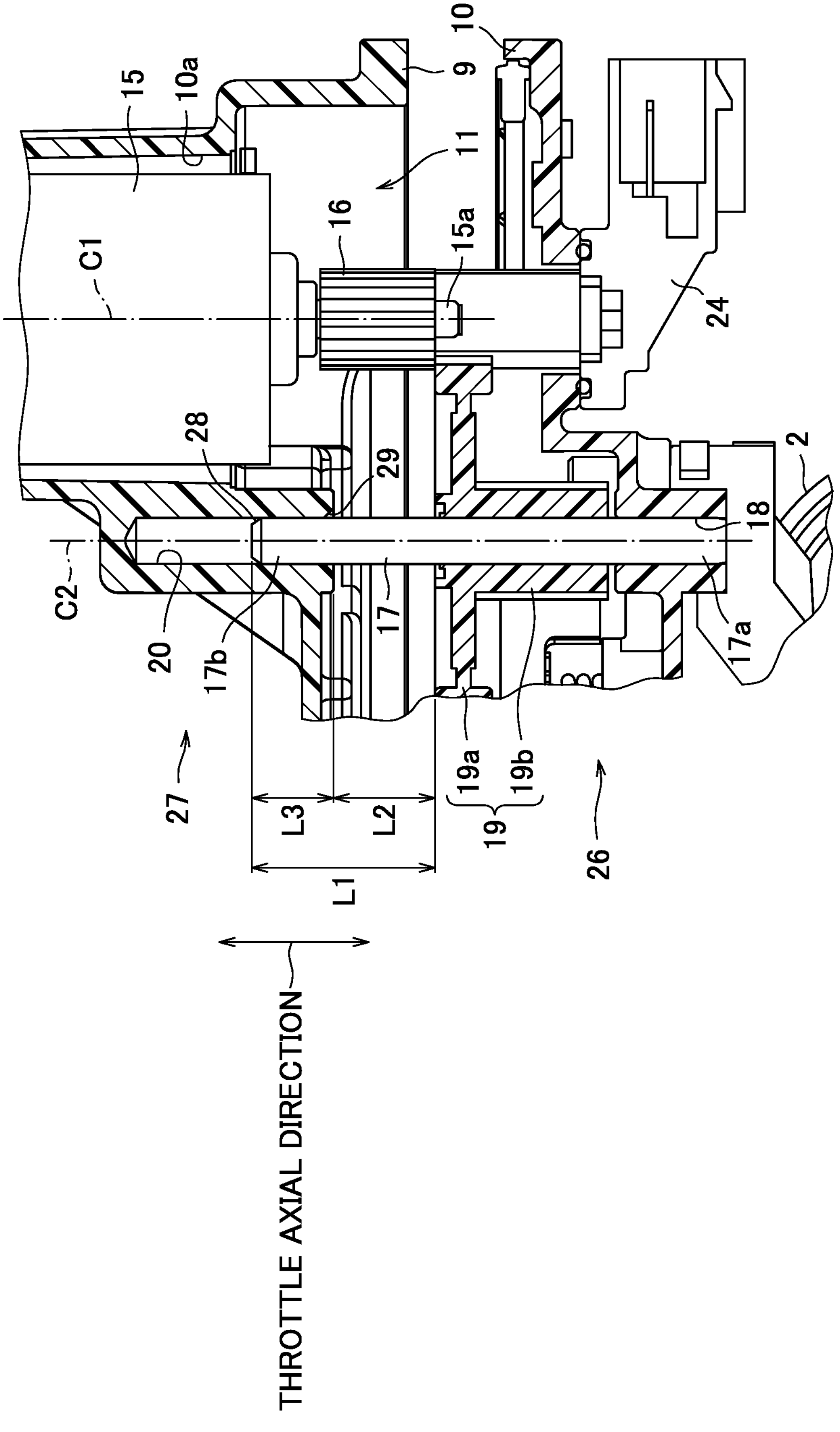
FIG. 7 is a sectional view illustrating a state where the throttle body-side assembly and the gear cover-side assembly are caused to approach each other to establish coupling between them.

FIG. 6 is a sectional view illustrating a state where the throttle body-side assembly 26 and the gear cover-side assembly 27 are caused to face each other, and FIG. 7 is a sectional view illustrating a state where the throttle body-side assembly 26 and the gear cover-side assembly 27 are caused to approach each other to establish coupling therebetween.

When the throttle body-side assembly 26 and the gear cover-side assembly 27 are coupled to each other, it is necessary to fit the other end 17*b* of the support shaft 17 of the throttle body-side assembly 26 into the positioning hole 20 of the gear cover-side assembly 27 and to cause the large diameter portion 19*a* of the intermediate gear 19 supported by the support shaft 17 to mate with the driving gear 16 of the gear cover-side assembly 27.

In order to easily perform such a coupling operation, a projecting length L1 is set to be longer than a projecting length L2 when the projecting length of the other end 17*b* of the support shaft 17 from the end surface of the large diameter portion 19*a* of the intermediate gear 19 is assumed to be L1 and the projecting length of the driving gear 16 from the opening surface of the gear cover 10 in which the positioning hole 20 is open is assumed to be L2 in the throttle axial direction (L1>L2). Specifically, a value L3 that is greater than the total of lengths l1 and l2 is added to the projecting length L2 to set the projecting length L1 in consideration of the length l1 of a chamfered portion 28 formed at the other end 17*b* of the support shaft 17 and the length l2 of a chamfered portion 29 formed at the opening portion of the positioning hole 20 in the present embodiment (L1=L2+L3, L3>l1+l2).

<<Operation of Coupling Assemblies 26 and 27 and Achieved Effects and Advantages>>

An operation of coupling the assemblies 26 and 27, each of which has been completely assembled, is performed in the following procedure.

As illustrated in FIG. 6, the throttle body-side assembly 26 and the gear cover-side assembly 27 are caused to face each other. In the arrangement, the other end 17*b* of the support shaft 17 and the opening portion of the positioning hole 20 face each other, and the outer periphery of the large diameter portion 19*a* of the intermediate gear 19 and the outer periphery of the driving gear 16 face each other. Once the assemblies 26 and 27 are caused to gradually approach each other, the other end 17*b* of the support shaft 17 starts to be fitted into the positioning hole 20 first, and the large diameter portion 19*a* of the intermediate gear 19 and the driving gear 16 then start to mate with each other at the point when the fitting length of the support shaft 17 into the positioning hole 20 reaches the value L3 as illustrated in FIG. 7.

With the approaching between the assemblies 26 and 27, the fitting length of the support shaft 17 exceeds L3 and further increases, and the mating length between the large diameter portion 19*a* and the driving gear 16 in the throttle axial direction gradually increases. Then, the large diameter portion 19*a* of the intermediate gear 19 and the driving gear 16 completely mate with each other at the point when the gear case 9 and the gear cover 10 are coupled to each other as illustrated in FIG. 5, and the coupling operation is completed by fastening the gear case 9 and the gear cover 10 with a screw 8.

As described above, the other end 17_b_ of the support shaft 17 starts to be fitted into the positioning hole 20 prior to the mating between the large diameter portion 19_a_ of the intermediate gear 19 and the driving gear 16 in the process of causing the assemblies 26 and 27 to approach each other. Therefore, the support shaft 17 functions as a so-called positioning pin at and after the point, the positional relationship between the large diameter portion 19_a_ of the intermediate gear 19 and the driving gear 16, in other words, a gear pitch is fixed, and the operation of causing the large diameter portion 19_a_ and the driving gear 16 to mate with each other is performed in this state.

According to the throttle device in Patent Document 1, it is necessary to perform the operation of fitting the support shaft into the positioning hole and the operation of causing the gears to mate with each other in parallel when the assemblies are coupled. Furthermore, it is necessary to finely adjust the relative angles while accurately maintaining the positional relationship between the small diameter gear portion and the final gear in the mating operation, and due to these factors, it is difficult to perform the operation of coupling the assemblies.

On the other hand, according to the present embodiment, it is not necessary to perform the operation of fitting the support shaft 17 into the positioning hole 20 and the mating between the gears at the same time, and it is possible to concentrate on each operation. Additionally, since the operation of causing the gears to mate with each other is performed in a state where the gear pitch has been fixed by the fitting of the support shaft 17 into the positioning hole 20, it is possible for an operator to easily start the mating between the gears with a simple operation of finely adjusting the relative angles thereof without particularly paying attention to the positional relationship between the large diameter portion 19_a_ and the driving gear 16.

In addition, since the approaching between the assemblies 26 and 27 is guided with the gear pitch continuously maintained by the support shaft 17 even after the gears start to mate with each other, it is possible to easily couple the gear case 9 to the gear cover 10 in a normal posture. Although the operator during the operation may not be able to visually recognize the mating state between the gears and the positional relationship between the support shaft 17 and the positioning hole 20, which are important, due to interruption of the gear cover 10, it is still possible to easily perform both the fitting operation and the mating operation even under such a condition.

Particularly, in the present embodiment, since the chamfered portions 28 and 29 are formed at the other end 17_b_ of the support shaft 17 and the opening portion of the positioning hole 20, respectively, in order to facilitate the insertion of the support shaft 17 into the positioning hole 20, the timing at which the support shaft 17 starts to be fitted into the positioning hole 20 is delayed by the amount corresponding to the lengths 11 and 12 of the chamfered portions 28 and 29 in the process of causing the assemblies 26 and 27 to approach each other. In other words, it is possible to cause the support shaft 17 to start to be fitted into the positioning hole 20 prior to the start of the mating between the gears if the projecting length L1 of the shaft 17 is set to be longer than the projecting length L2 of the driving gear 16 in a case where the chamfered portions 28 and 29 are not provided. However, where the chamfered portions 28 and 29 are formed, the substantial projecting length L1 of the support shaft 17 decreases by the amount corresponding to the lengths l1 and l2 thereof.

Thus, in the present embodiment, the value L3 that is greater than the total l1+l2 of the lengths 11 and l2 is added to the projecting length L2 to set the projecting length L1. Therefore, the support shaft 17 is reliably fitted into the positioning hole 20 before the timing when the gears start to mate with each other as described above on the basis of FIG. 7, and it is thus possible to achieve the aforementioned advantages regarding the operation of causing the gears to mate with each other.

However, the projecting length L1 may be set to be any value that is sufficiently greater than the projecting length L2 without considering the specific lengths 11 and 12 of the chamfered portions 28 and 29.

Figure 8:
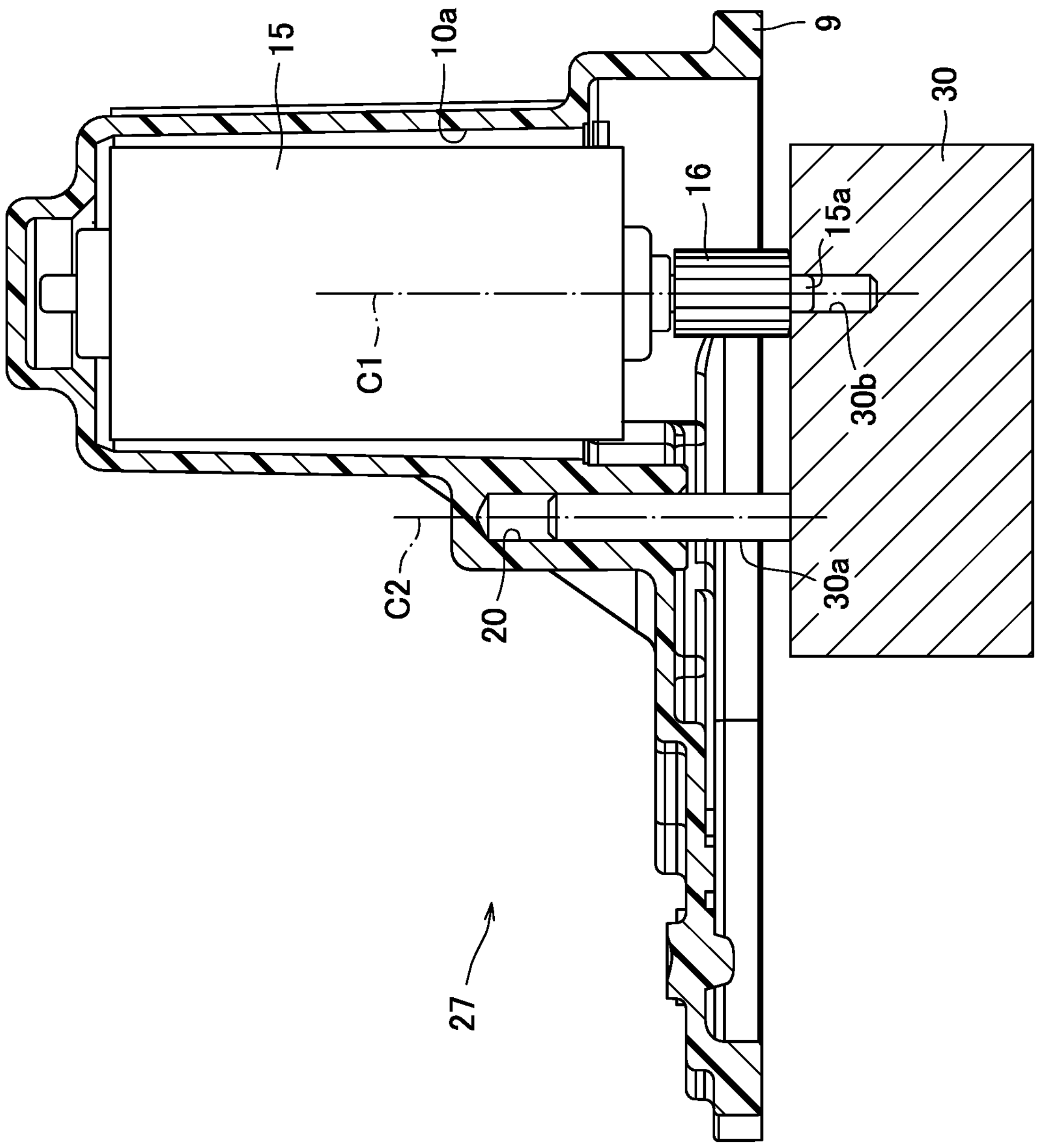
FIG. 8 is an explanatory diagram illustrating a state where a motor to be attached to a gear case is positioned by using a jig.

On the other hand, the motor 15 of the gear cover-side assembly 27 is attached to the gear cover 10 in a posture with the output shaft 15_a_ directed in a direction in which the positioning hole 20 in the gear cover 10 is open. In other words, since the positioning hole 20 and the output shaft 15_a_ are directed in the same direction, it is possible to adjust the position of the motor 15 by using a jig 30 as illustrated in FIG. 8. Specifically, it is necessary to secure the motor 15 at an appropriate position on the gear cover 10 with reference to the positioning hole 20 in order to maintain the driving gear 16 and the intermediate gear 19 at a normal gear pitch. A positioning pin 30_a_ and a positioning hole 30_b_ are formed in the jig 30 at a gap corresponding to the gear pitch, the positioning pin 30_a_ is fitted into the positioning hole 20 of the gear cover 10, and the positioning hole 20 is fitted onto the output shaft 15_a_ of the motor 15. In this manner, the motor 15 is adjusted to a normal position, and if the motor 15 is secured in this state, it is possible to maintain the positioning hole 20 and the output shaft 15_a_ at a normal gear pitch.

Incidentally, in the present embodiment, the intermediate gear 19 and the support shaft 17 are provided in the throttle body-side assembly 26, the support shaft 17 is fitted into the positioning hole 20 of the gear cover 10, and the large diameter portion 19_a_ of the intermediate gear 19 is caused to mate with the output shaft 15_a_ of the motor 15, with the coupling to the gear cover-side assembly 27. However, the present invention is not limited thereto, and the intermediate gear 19 and the support shaft 17 may be provided in the gear cover-side assembly 27, for example, which will be described below as another example 1. Note that in another example 1 and another example 2, which will be described later, the same member numbers will be applied to portions with the same configurations as those in the embodiment, description thereof will be omitted, and differences will be mainly described.

Another Example 1

Figure 9:
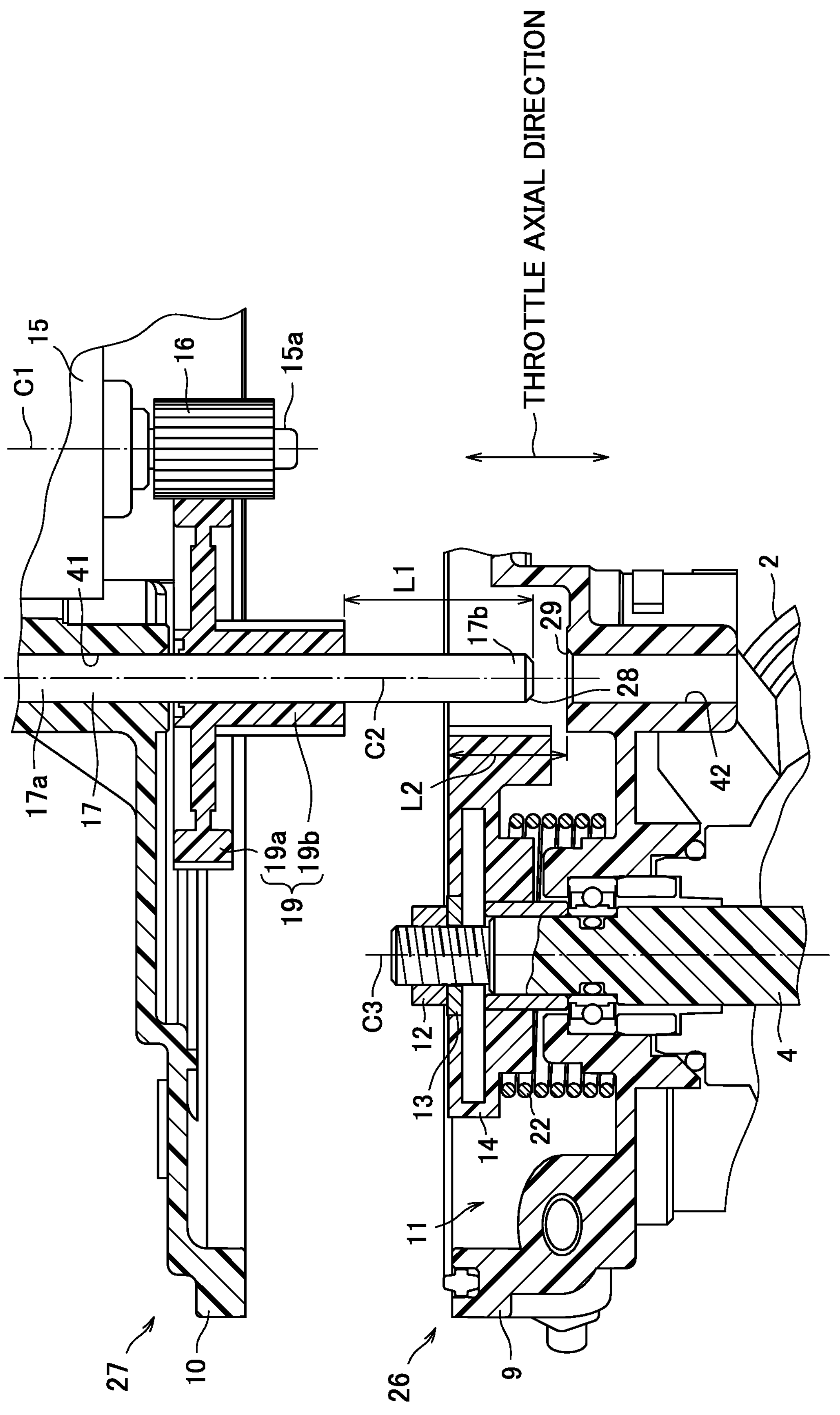
FIG. 9 is a sectional view illustrating a throttle device in another example 1 in which an intermediate gear and a support shaft are provided on the side of a gear case and corresponding to FIG. 6.
Figure 10:
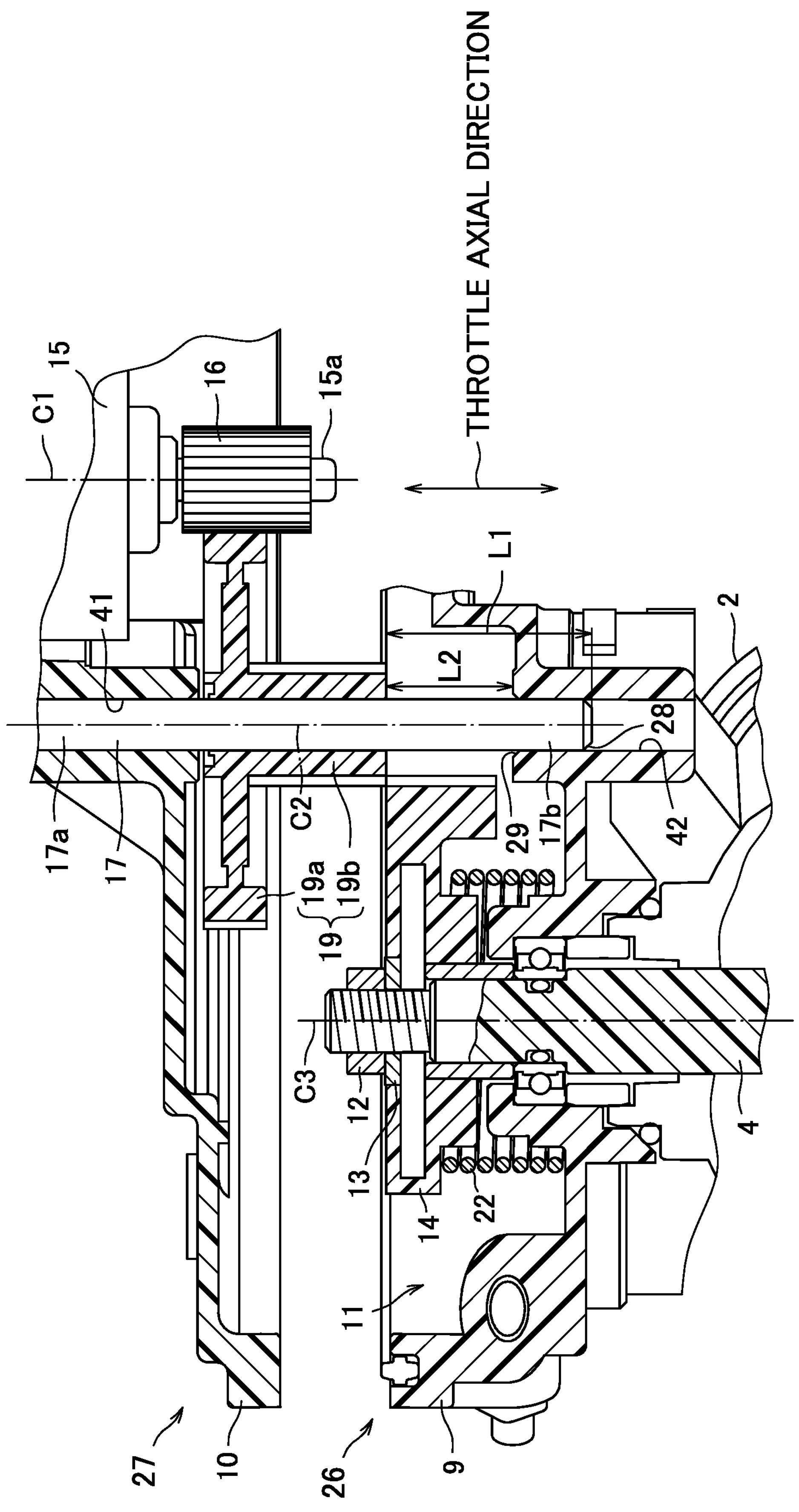
FIG. 10 is a sectional view illustrating the throttle device in another example 1 and corresponding to FIG. 7.

FIG. 9 is a sectional view illustrating a throttle device 1 in another example 1 in which an intermediate gear 19 and a support shaft 17 are provided on the side of a gear case 9 and corresponding to FIG. 6, and FIG. 10 is a sectional view illustrating the throttle device 1 in another example 1 and corresponding to FIG. 7.

A press-fitting hole 41 is formed in a gear cover 10 instead of the positioning hole 20 in the embodiment, and one end 17_a_ of the support shaft 17 is press-fitted into the press-fitting hole 41. An intermediate gear 19 is rotatably supported by the support shaft 17, and a large diameter portion 19_a_ thereof mates with a driving gear 16. Therefore, the gear cover 10, a motor 15, the driving gear 16, the intermediate gear 19, and the support shaft 17 configure a gear cover-side assembly 27 in another example 1.

Also, a positioning hole 42 is formed in the gear case 9 instead of the press-fitting hole 18 in the embodiment, and the other end 17*b* of the support shaft 17 is press-fitted into the positioning hole 42 when the assemblies 26 and 27 are coupled to each other. Therefore, a throttle valve 3, a throttle shaft 4, a driven gear 14, and the gear case 9 configure a throttle body-side assembly 26 in another example 1.

In another example 1, it is necessary to fit the other end 17*b* of the support shaft 17 of the gear cover-side assembly 27 into the positioning hole 42 of the throttle body-side assembly 26 and to cause the small diameter portion 19*b* of the intermediate gear 19 supported by the support shaft 17 to mate with the driven gear 14 of the throttle body-side assembly 26 when the assemblies 26 and 27 are coupled to each other. Thus, a projecting length L1 is set to be longer than a projecting length L2 when the projecting length of the other end 17*b* of the support shaft 17 from an end surface of the small diameter portion 19*b* of the intermediate gear 19 is assumed to be L1 and the projecting length of the driven gear 14 from an opening surface of the gear case 9 in which the positioning hole 42 is open is assumed to be L2 in the throttle axial direction (L1>L2). Note that the projecting length L1 may be set on the basis of a value L3 in consideration of a chamfered portion 28 at the other end 17*b* of the support shaft 17 and the chamfered portion 29 at the opening portion of the positioning hole 42 similarly to the embodiment.

Once the assemblies 26 and 27 are caused to gradually approach each other, the other end 17*b* of the support shaft 17 starts to be fitted into the positioning hole 42 first, and the small diameter portion 19*b* of the intermediate gear 19 and the driven gear 14 start to mate with each other at a point at which the support shaft 17 is fitted into the positioning hole 42 to some extent as illustrated in FIG. 10. Therefore, although repeated description is omitted, it is possible to perform the operation of fitting the support shaft 17 into the positioning hole 42 and the mating between the gears in order, and it is possible to concentrate on each operation. Additionally, since the operation of causing the gears to mate with each other is performed in a state where the gear pitch has been fixed by the support shaft 17 being fitted into the positioning hole 42, it is possible to easily cause the gears to mate with each other.

In addition, the motor 15 provided at the gear cover-side assembly 27 is attached to the gear cover 10 in a posture with the output shaft 15*a* directed in a direction in which the support shaft 17 of the gear cover 10 projects. Therefore, although not illustrated, it is possible to adjust the position of the motor 15 by using a jig including a positioning hole into which the support shaft 17 is fitted and a positioning hole which is fitted onto the output shaft 15*a* similarly to the jig 30 in the embodiment.

Incidentally, although rotation of the driving gear 16 is transmitted to the driven gear 14 via a single intermediate gear 19 in the embodiment, the present invention is not limited thereto. For example, the rotation may be transmitted via a plurality of intermediate gears, which will be described below as another example 2.

Another Example 2

Figure 11:
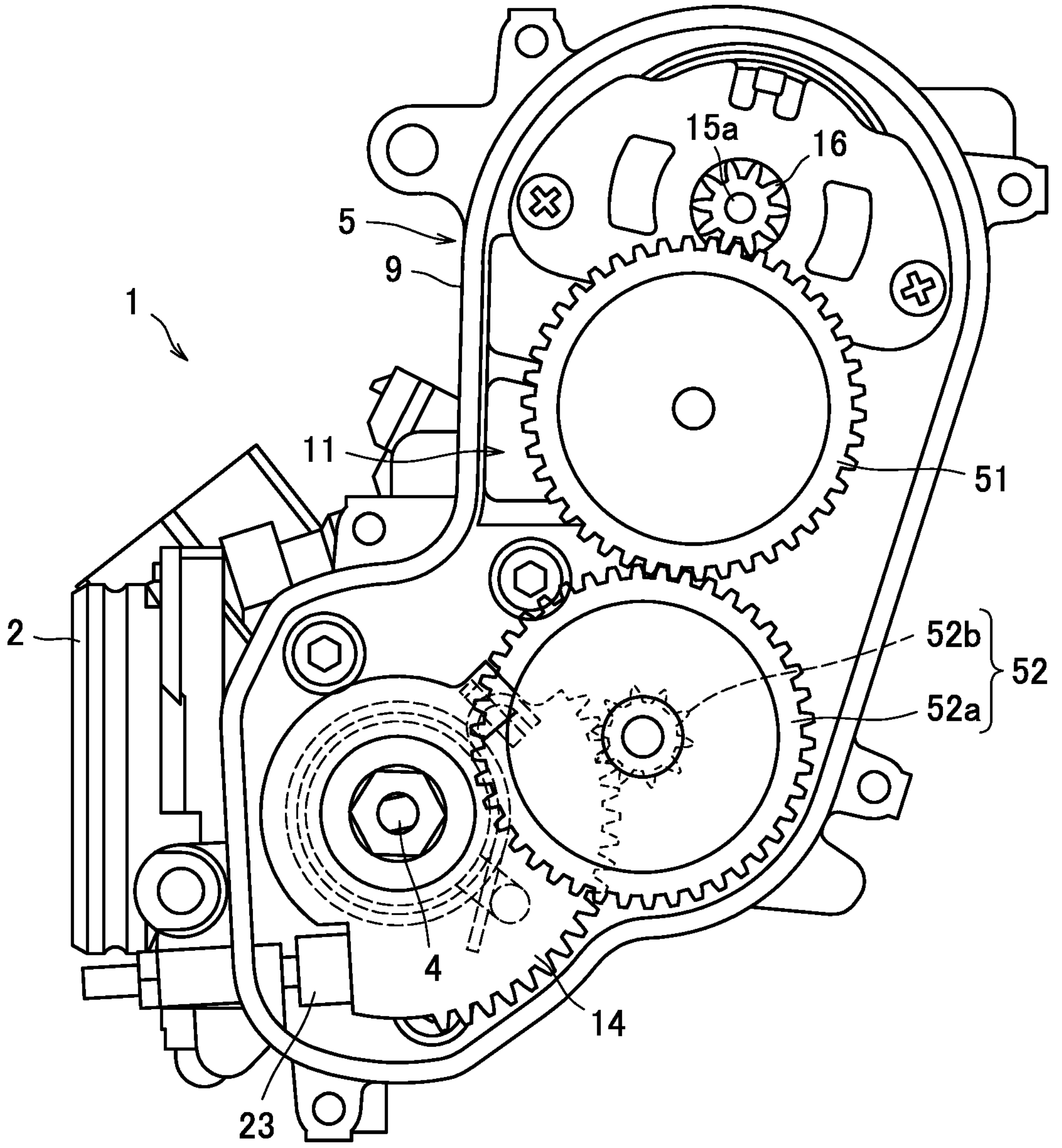
FIG. 11 is a side view illustrating a throttle device in another example 2 in which a pair of intermediate gears are included and corresponding to FIG. 4.

FIG. 11 is a side view illustrating a throttle device 1 in another example 2 in which a pair of intermediate gears are included and corresponding to FIG. 4.

Rotation of a driving gear 16 is transmitted to a first intermediate gear 51 that functions as an idler gear and is further transmitted to a large diameter portion 52*a* of a second intermediate gear 52. Rotation of a small diameter portion 52*b* of the second intermediate gear 52 is transmitted to a driven gear 14, and a throttle valve 3 is thereby opened or closed along with a throttle shaft 4.

In the throttle device 1 with such a configuration, the driving gear 16 is caused to mate with the first intermediate gear 51 with coupling between assemblies 26 and 27 in a case where only the driving gear 16 is provided in the gear cover-side assembly 27, for example. Also, the first intermediate gear 51 is caused to mate with the large diameter portion 52*a* of the second intermediate gear 52 with the coupling between the assemblies 26 and 27 in a case where the driving gear 16 and the first intermediate gear 51 are provided in the gear cover-side assembly 27.

Also, in a case where the driving gear 16, the first intermediate gear 51, and the second intermediate gear 52 are provided in the gear cover-side assembly 27, the small diameter portion 52*b* of the second intermediate gear 52 is caused to mate with the driven gear 14 with the coupling between the assemblies 26 and 27. Although repeated description is omitted, it is possible to achieve similar effects and advantages in any case as long as the projecting lengths L1 and L2 are set similarly to the embodiment.

Although description of the embodiment ends here, aspects of the present invention are not limited to the embodiment. Although the throttle device 1 including a single throttle bore 2 mounted on a motorized two-wheeled vehicle is implemented in the above embodiment, for example, the present invention is not limited thereto and can be applied to a throttle device for an engine mounted on various vehicles. Also, the throttle device according to the present invention may be applied to engines used for applications other than the power source for traveling, for example, an engine for a power generator. Furthermore, the present invention may be implemented as a multiple-throttle device including a plurality of throttle bores.

REFERENCE SIGNS LIST

1 Throttle device
2 Throttle body
3 Throttle shaft
4 Throttle valve
9 Gear case
10 Gear cover
11 Gear accommodating chamber
14 Driven gear
15 Motor
15*a* Output shaft
16 Driving gear
17 Support shaft
17*a* One end
17*b* Other end
19 Intermediate gear
19*a* Large diameter portion
19*b* Small diameter portion
42 Positioning hole
26 Throttle body-side assembly
27 Gear cover-side assembly
51 Second intermediate gear (intermediate gear)

What is claimed is:

1. A throttle device for an engine comprising a throttle body-side assembly and a gear cover-side assembly coupled to each other, the throttle body-side assembly including a throttle body and a throttle valve supported at the throttle body by a throttle shaft such that the throttle valve is able to open and close, the gear cover-side assembly including a gear cover and a motor attached to the gear cover, the throttle device further comprising a driven gear secured to an end portion of the throttle shaft, a driving gear secured to an output shaft of the motor, and an intermediate gear which is supported by a support shaft and transmits rotation of the driving gear to the driven gear, which are accommodated in a gear accommodating chamber defined between a gear case provided at the throttle body and the gear cover, wherein the support shaft has one end secured to the gear case and configures the throttle body-side assembly along with the intermediate gear, the intermediate gear mates with the driving gear of the gear cover-side assembly or the driven gear of the throttle body-side assembly with the coupling between the throttle body-side assembly and the gear cover-side assembly, the gear cover includes a positioning hole into which the other end of the support shaft is inserted with the coupling between the throttle body-side assembly and the gear cover-side assembly, and a projecting length of the other end of the support shaft from an end surface of the intermediate gear is set to be longer than a projecting length of the driving gear from an opening surface in which the positioning hole is open, the motor is attached to the gear cover in a posture with the output shaft directed in a direction in which the positioning hole is open, and a fitting length of the support shaft into the positioning hole, in a state that the gear case and the gear cover are coupled to each other, is longer than the projecting length of the driving gear from the opening surface of the gear cover in which the positioning hole is open.

2. The throttle device according to claim 1, wherein the intermediate gear includes a large diameter portion which mates with the driving gear and a small diameter portion which is provided in parallel with the large diameter portion on the side of the gear case and mates with the driven gear, and a projecting length of the other end of the support shaft from an end surface of the large diameter portion as the projecting length of the other end of the support shaft from the end surface of the intermediate gear is set to be longer than the projecting length of the driving gear from the opening surface of the gear cover in which the positioning hole is open.

3. The throttle device according to claim 1, wherein the intermediate gear is one of a plurality of gears which mate with each other and transmit rotation of the driving gear to the driven gear.

* * * * *